(12) United States Patent
Lowe et al.

(10) Patent No.: US 7,051,226 B1
(45) Date of Patent: *May 23, 2006

(54) METHOD AND SYSTEM FOR PROVIDING PRIORITY TO A STATION IN A CONGESTED HALF DUPLEX ETHERNET NETWORK

(75) Inventors: Glen H. Lowe, Union City, CA (US); Leslie Thorne, San Jose, CA (US); Gary Takushi, Milpitas, CA (US)

(73) Assignee: 3Com Corporation, Santa CLara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/371,463

(22) Filed: Aug. 10, 1999

(51) Int. Cl.
*G06F 1/14* (2006.01)

(52) U.S. Cl. .................. 713/500; 713/502; 713/600; 370/395.42; 370/444; 370/455; 398/36; 710/8; 710/44; 710/313; 709/207; 709/226; 709/228; 709/229; 709/240

(58) Field of Classification Search ............. 709/370, 709/235, 220, 223, 226, 245, 207, 228, 229, 709/240; 713/201, 500, 600, 502; 370/444, 370/445, 447, 448, 229, 395.42, 455; 398/36; 710/8, 44, 313
See application file for complete search history.

(56) References Cited

U.S. PATENT DOCUMENTS

| | | | | |
|---|---|---|---|---|
| 4,598,285 A | * | 7/1986 | Hoshen | 340/825.5 |
| 5,268,899 A | * | 12/1993 | Brown | 370/448 |
| 5,353,287 A | * | 10/1994 | Kuddes et al. | 370/85.2 |
| 5,600,651 A | * | 2/1997 | Molle | 370/448 |
| 5,650,997 A | * | 7/1997 | Yang et al. | 370/448 |
| 5,699,515 A | * | 12/1997 | Berkema et al. | 395/200.06 |
| 5,784,375 A | * | 7/1998 | Kalkunte et al. | 370/448 |
| 5,822,538 A | * | 10/1998 | Krishna et al. | 709/235 |
| 5,838,688 A | * | 11/1998 | Kadambi et al. | 370/445 |
| 5,841,778 A | * | 11/1998 | Shaffer et al. | 370/447 |
| 5,852,723 A | * | 12/1998 | Kalkunte et al. | 395/200.65 |
| RE36,353 E | * | 10/1999 | Yang et al. | 370/448 |
| 5,963,560 A | * | 10/1999 | Kalkunte | 370/448 |
| 6,128,310 A | * | 10/2000 | Chow et al. | 370/448 |
| 6,205,153 B1 | * | 3/2001 | Shaffer et al. | 370/445 |
| 6,359,899 B1 | * | 3/2002 | Krishnakumar et al. | 370/444 |

(Continued)

FOREIGN PATENT DOCUMENTS

JP 359204347 A * 11/1983

(Continued)

*Primary Examiner*—Lynne H. Browne
*Assistant Examiner*—Nitin C. Patel

(57) ABSTRACT

A method and system for providing priority to a station in a congested half duplex Ethernet network. Specifically, one embodiment of the present invention includes a method for providing priority to a peripheral component (e.g., half duplex Network Interface Card) in a congested network. The method includes the step of detecting a collision of a data packet during transmission of the data packet by a peripheral component coupled to a network. Furthermore, the method includes the step of determining a restricted back off time. It should be appreciated that the restricted back off time is substantially equal to or less than a restricted time value. Additionally, the method includes the step of causing the peripheral component to wait the restricted back off time before trying to retransmit the data packet over the network.

21 Claims, 4 Drawing Sheets

U.S. PATENT DOCUMENTS

| | | | |
|---|---|---|---|
| 6,522,661 B1 * | 2/2003 | Min | 370/445 |
| 6,606,327 B1 * | 8/2003 | Lowe et al. | 370/448 |
| 6,614,799 B1 * | 9/2003 | Gummalla et al. | 370/448 |
| 6,704,302 B1 * | 3/2004 | Einbinder et al. | 370/352 |
| 6,813,260 B1 * | 11/2004 | Fogle | 370/338 |

FOREIGN PATENT DOCUMENTS

| | | | |
|---|---|---|---|
| JP | 361256845 A | * | 11/1986 |
| JP | 402149041 A | * | 6/1990 |
| JP | 411239140 A | * | 2/1998 |

* cited by examiner

METHOD AND SYSTEM FOR PROVIDING PRIORITY TO A STATION IN A CONGESTED HALF DUPLEX ETHERNET NETWORK

TECHNICAL FIELD

The present invention generally relates to the field of computer networking. More particularly, the present invention relates to the field of data packet transmissions within an Ethernet network.

BACKGROUND ART

Computers have become an integral tool used in a wide variety of different applications, such as in finance and commercial transactions, computer-aided design and manufacturing, health care, telecommunication, education, etc. Computers are also finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via electronic mail (e-mail) and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a Network Interface Card (NIC). Essentially, the NIC works with the operating system and Central Processing Unit (CPU) of a host computer to control the flow of information over the LAN. Some NICs may also be used to connect a computer to the Internet.

Typically, NICs are also used to communicate over a LAN communications network standard referred to as Ethernet. It is appreciated that if two NICs coupled to an Ethernet network each try to transmit a packet or frame of data at the same time within a half duplex network, a collision of those packets occurs. As such, each NIC involved in the collision backs off a random amount of time before trying to retransmit their respective data packet. Within the Ethernet network, each half duplex NIC is allowed 16 collisions to transmit a current data packet before discarding it in order to begin transmitting a subsequent data packet. Furthermore, as the number of collisions of a particular data packet increases within the Ethernet network, the half duplex NIC has an increased possibility of backing off for a longer amount time.

It should be appreciated that more and more half duplex NICs can be coupled to the Ethernet network enabling more and more computers to access the same information and share data. But there are disadvantages associated with numerous half duplex NICs being coupled to the Ethernet network. One of the main disadvantages is that as more and more half duplex NICs are coupled to the Ethernet network, there is an increased possibility of more and more data packet collisions thereby resulting in a more congested network. As such, a half duplex NIC of a particular computer (e.g., file server) which handles a high volume of data packet traffic is unable to efficiently transmit its data packets because of an increased occurrence of data packet collisions.

Accordingly, a need exists for a method and system for providing priority to a half duplex Network Interface Card (NIC) of a particular computer station (e.g., file server) which is coupled to a congested Ethernet network.

DISCLOSURE OF THE INVENTION

The present invention provides a method and system for providing priority to a half duplex Network Interface Card (NIC) of a particular computer station (e.g., file server) which is coupled to a congested Ethernet network. Furthermore, the present invention provides a method and system which achieves the above accomplishment and thereby improves the efficiency of data packet transmission over the Ethernet network of the half duplex NIC of the particular computer station.

Specifically, one embodiment of the present invention includes a method for providing priority to a peripheral component (e.g., half duplex Network Interface Card) in a congested network. The method includes the step of detecting a collision of a data packet during transmission of the data packet by a peripheral component coupled to a network. Furthermore, the method includes the step of determining a restricted back off time. It should be appreciated that the restricted back off time is substantially equal to or less than a restricted time value. Additionally, the method includes the step of causing the peripheral component to wait the restricted back off time before trying to retransmit the data packet over the network.

In another embodiment, the present invention includes a computer system. The computer system includes a processor, an addressable data bus coupled to the processor, and a computer usable memory coupled to communicate with the processor for performing a method for providing priority to a peripheral component (e.g., half duplex Network Interface Card) coupled to a network. Specifically, the method includes the step of detecting a collision of a data packet during transmission of the data packet by the peripheral component. Moreover, the method includes the step of determining a restricted back off time. It should be appreciated that the restricted back off time is substantially equal to or less than a restricted time value. Furthermore, the method also includes the step of causing the peripheral component to wait the restricted back off time before trying to retransmit the data packet over the network.

In still another embodiment, the present invention includes a computer readable medium having computer readable code embodied therein for causing a peripheral component to perform steps. Specifically, the computer readable medium causes the peripheral component to perform the step of detecting a collision of a data packet during transmission of the data packet by the peripheral component coupled to a network. Additionally, the computer readable medium causes the peripheral component to perform the step of determining a restricted back off time. It should be appreciated that the restricted back off time is substantially equal to or less than a restricted time value. Moreover, the computer readable medium causes the peripheral component to perform the step of causing the peripheral component to wait the restricted back off time before trying to retransmit the data packet over the network.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
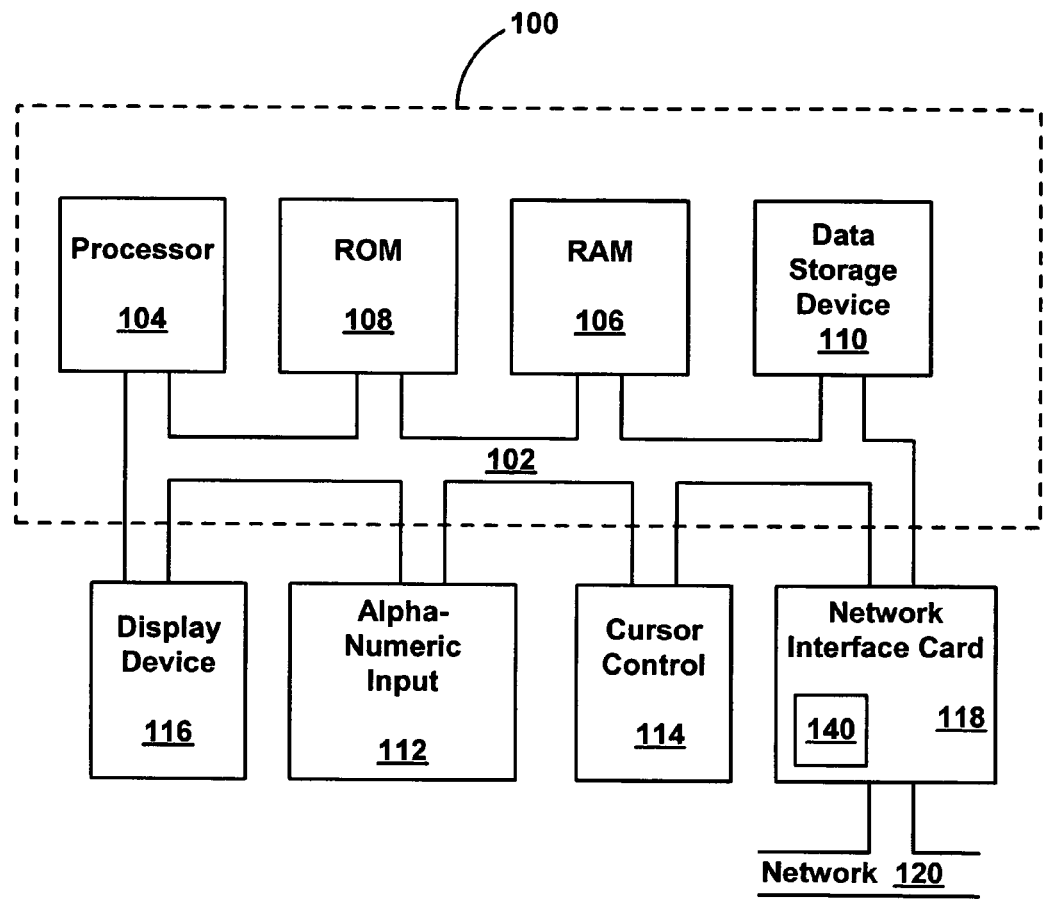
FIG. 1 is a block diagram of an exemplary computer system used in accordance with one embodiment of the present invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "detecting", "determining", "causing", "generating", "receiving", "using", "transmitting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is only exemplary and that the present invention can operate within a number of different computer systems including general purpose networked computer systems, embedded computer systems, stand alone computer systems, and the like.

System 100 of FIG. 1 includes an address/data bus 102 for communicating information, and a central processor unit 104 coupled to bus 102 for processing information and instructions. Central processor unit 104 may be an 80×86-family microprocessor or any other type of processor. System 100 also includes data storage features such as a computer usable volatile memory 106 (e.g., random access memory, static RAM, dynamic RAM, etc.) coupled to bus 102 for storing information and instructions for central processor unit 104, computer usable non-volatile memory unit 108 (e.g., read only memory, programmable ROM, flash memory, EPROM, EEPROM, etc.) coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112, which includes alphanumeric and function keys, is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (e.g., cursor) on a display screen of display device 116. Many implementations of cursor control device 114 are known in the art including a mouse, trackball, touch pad, joystick or special keys on alphanumeric input device 112 capable of signaling movement of a given direction or manner of displacement. Alternatively, it is appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

With reference still to FIG. 1, a half duplex Network Interface Card (NIC) 118 in accordance with one embodiment of the present invention coupled to bus 102 is connected to a network 120 and controls the flow of information of computer system 100 over network 120. Specifically, data packets, such as Ethernet packets, that are incoming and outgoing via network 120 are transmitted and received by half duplex NIC 118. Furthermore, a back off time restrictor circuit 140 in accordance with one embodiment of the present invention is implemented as part of half duplex NIC 118. A more detailed discussion of half duplex NIC 118 and back off time restrictor circuit 140 in furtherance of the present invention is found below. It should be appreciated that the present invention is well suited for other types of Network Interface Cards and is not strictly limited to a half duplex Network Interface Card.

DETAILED DESCRIPTION OF THE STRUCTURE AND OPERATION OF THE PRESENT INVENTION

In the following description of embodiments of the present invention, a Network Interface Card is a peripheral component. Although the present embodiments specifically recite a Network Interface Card, the present invention is also well suited to an embodiment employing various other peripheral components. That is, the present invention is well suited to an embodiment in which the peripheral component is, for example, a PCMCIA (personal computer memory card international association) card. Similarly, the present invention is well suited to an embodiment in which the peripheral component is, for example, a compact form factor I/O (input/output) card. Additionally, the present invention is well suited to use in an embodiment in which the peripheral component is, for example, a rate controller, a small computer system interface (SCSI) controller, a graphics card, and the like. Furthermore, the present invention is well suited to be used, for example, in a non-peripheral component environment such as an Application Specific Integrated Circuit (ASIC) disposed on a motherboard, an embedded circuit, and the like.

As previously mentioned above, the present invention provides a method and system for providing priority to a half duplex Network Interface Card (NIC) of a particular computer station (e.g., file server) which is coupled to a congested Ethernet network. Within one embodiment in accordance with the present invention, this is accomplished by specifically restricting the length of time of all or a portion of the back off times corresponding to data packet collisions of the half duplex NIC. As such, the half duplex NIC potentially waits for a shorter amount of time before attempting to retransmit a particular data packet as compared to other typical half duplex NICs coupled to the Ethernet network. In this manner, the half duplex NIC in accordance with the present invention has priority within the congested Ethernet network. Furthermore, the present invention improves the efficiency of data packet transmission over the Ethernet network of the half duplex NIC of the particular computer station.

Figure 2:
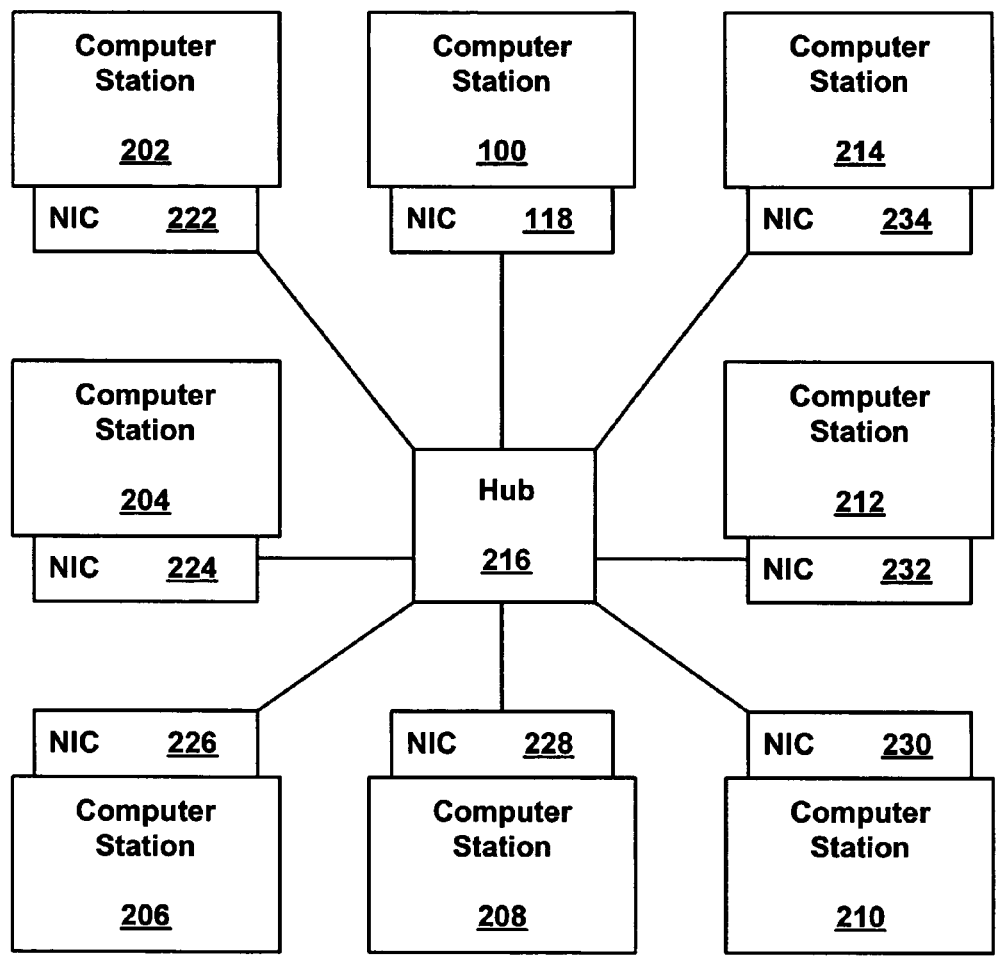
FIG. 2 is a block diagram of an Ethernet network used in accordance with one embodiment of the present invention.

With reference now to FIG. 2, which is a block diagram of an Ethernet network 120 used in accordance with one embodiment of the present invention. It should be appreciated that the present invention is not strictly limited to operation within Ethernet network 120. On the contrary, the present invention is well suited for operation within different types of communication networks. As such, Ethernet network 120 is an exemplary network used in accordance with one embodiment of the present invention. Within FIG. 2, it is appreciated that computer station 100 of FIG. 1 is coupled to and is part of Ethernet network 120. Specifically, half duplex NIC 118 of computer station 100 is coupled to a hub 216 of Ethernet network 120. The operation and functionality of hub 216 is well known by those of ordinary skill in the art. Moreover, half duplex NICs 222–234 of computer stations 202–214, respectively, are each coupled to hub 216. By coupling half duplex NICs 222–234 and 118 in this manner, users of computer stations 202–214 and 100 have access to the same information and are able to share data within Ethernet network 120.

Within Ethernet network 120, it is appreciated that if two or more of half duplex NICs 222–234 and 118 try to transmit a data packet or frame at the same time, a collision of those packets will occur. As such, each half duplex NIC involved in the collision backs off a random amount of time before trying to retransmit their respective data packet. Each one of half duplex NICs 222–234 and 118 is allowed 16 collisions to transmit a particular data packet before discarding it in order to begin transmitting a subsequent data packet. Additionally, as the number of collisions of a particular data packet increases up to the value of 10, half duplex NICs 222–234 have an increased possibility of backing off for a longer amount of time. As to this particular functionality, it is important to note that half duplex NIC 118 of computer station 100 does not operate in the same manner as half duplex NICs 222–234 of computer stations 202–214.

Specifically, as the number of collisions of a particular data packet increases for half duplex NIC 118 of FIG. 2, one embodiment in accordance with the present invention implements a shorter restricted time value for the back off times as compared to the back off times of half duplex NICs 222–234. As such, the back off times of half duplex NIC 118 are substantially equal to or less than the shorter restricted time value. In this manner, half duplex NIC 118 potentially waits for a shorter amount of time before attempting to retransmit a particular data packet as compared to half duplex NICs 222–234 of Ethernet network 120. As such, half duplex NIC 118 achieves transmission priority over half duplex NICs 222–234 of computer stations 202–214 within Ethernet network 120.

Figure 3:
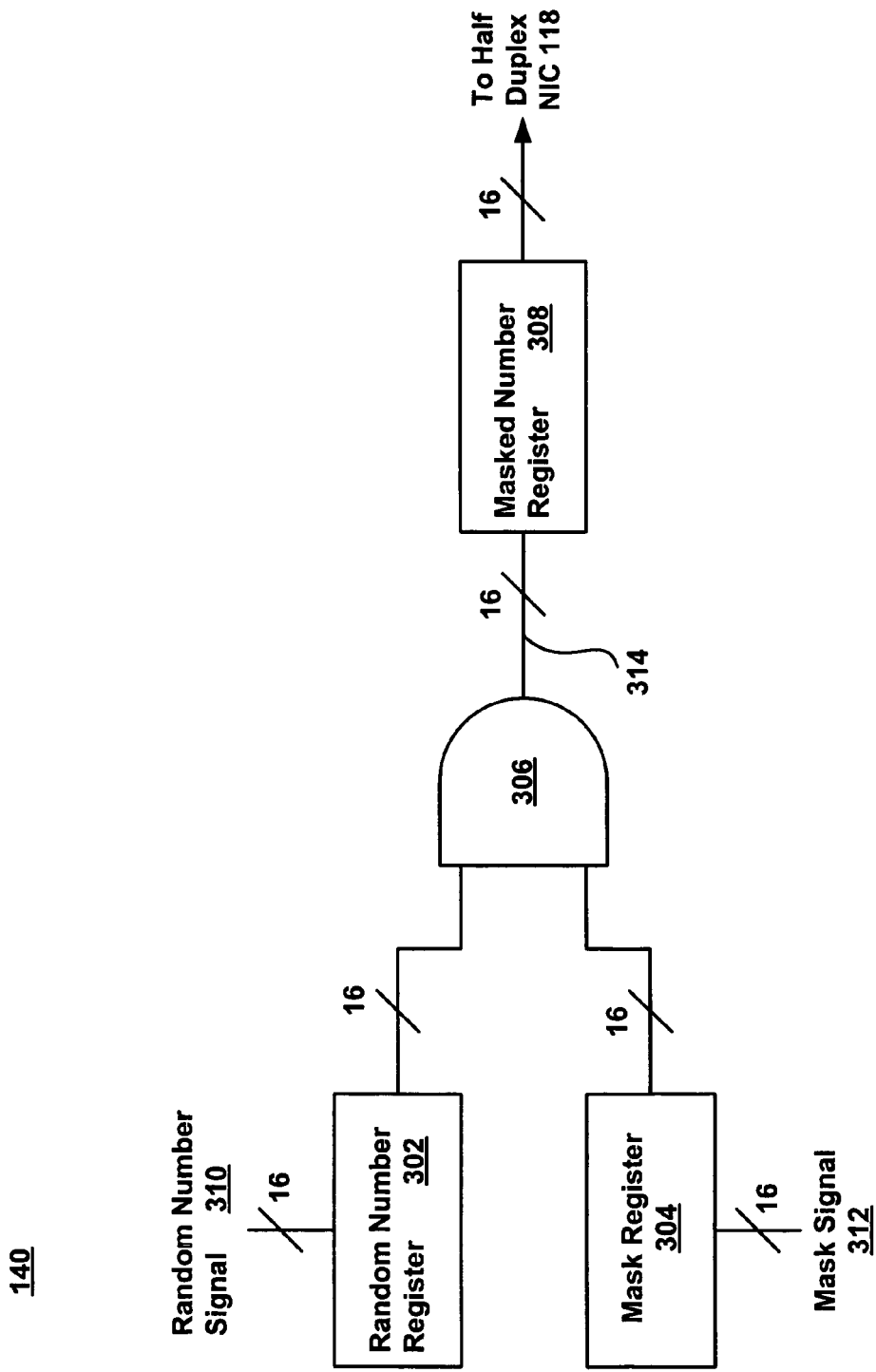
FIG. 3 is a schematic diagram of a back off time restrictor circuit implemented as part of half duplex Network Interface Card (NIC) in accordance with one embodiment of the present invention.

Referring now to FIG. 3, which is a schematic diagram of a back off time restrictor circuit 140 implemented as part of half duplex NIC 118, in accordance with one embodiment of the present invention. It should be appreciated that the present invention is not strictly limited to the embodiment shown as back off time restrictor circuit 140. Therefore, the present invention is well suited for a variety of different embodiments for performing the functionality of back off time restrictor circuit 140. As such, back off time restrictor circuit 140 is an exemplary circuit used in accordance with one embodiment of the present invention. The main function of back off time restrictor circuit 140 is to restrict or shorten the length of time of all or a portion of the back off times of half duplex NIC 118. Therefore, half duplex NIC 118 potentially waits for a shorter amount of time before attempting to retransmit a particular data packet as compared to half duplex NICs 222–234. In this fashion, back off time restrictor circuit 140 causes half duplex NIC 118 to have transmission priority over half duplex NICs 222–234 within Ethernet network 120.

Generally, when half duplex NIC 118 detects a collision of a data packet that it is transmitting, back off time restrictor circuit 140 receives a random number signal 310 which is stored within a random number register 302. Additionally, a predetermined mask signal 312 is stored within a mask register 304. The mask signal 312 and the random number signal 310 are input into a logical AND gate 306, where they are bit-wise ANDed together to produce a masked number signal 314. Within the present embodiment, the function of mask signal 312 is to mask or restrict the value of the resulting masked number signal 314, which subsequently results in a shorter back off time for half duplex NIC 118. The masked number signal 314 is stored within a masked number register 308. The restricted value represented by masked number signal 314 is subsequently used by half duplex NIC 118 to determine its back off time for the corresponding data packet collision. As such, the determined back off time of half duplex NIC 118 is restricted to a shorter amount of time. Therefore, half duplex NIC 118 potentially waits for a shorter amount of time before attempting to retransmit a particular data packet as compared to half duplex NICs 222–234 of FIG. 2.

Specifically, with reference still to FIG. 3, when half duplex NIC 118 detects a collision of a data packet that it is transmitting, a random number generator function (not shown) produces random number signal 310. Within the present embodiment, the determination of the value of random number signal 310 by the random number generator function complies with the 802.3 specification of the Institute of Electrical and Electronics Engineers (IEEE). Specifically, X is equal to the number of collisions of the data packet while Y is equal to the value of X or 10, whichever has a smaller value. The random number generator function then determines the value of random number signal 310 by randomly choosing an integer value N which is within the value range of 1 to $2^Y$, inclusively. For example, if X is equal to the value of 5, then Y is equal to the value of 5, since 5 has a smaller value than 10. The random number generator function then determines the value of random number signal 310 by randomly choosing the integer value of 15, which is within the value range of 1 to 32, inclusively. It should be appreciated that determining a random number value in this fashion is part of the 802.3 specification of the IEEE, which is well known by those of ordinary skill in the art.

Within the present embodiment, a random number register 302, which is a 16 bit register, is coupled to receive the random number signal 310 from the random number generator function. Upon receiving random number signal 310, the random number register 302 temporary stores it. Furthermore, predetermined mask signal 312 is stored within mask register 304, which is also a 16 bit register. The outputs of random number register 302 and mask register 304 are coupled to inputs of AND gate 306. As such, mask signal 312 and random number signal 310 are output to AND gate 306, where they are bit-wise ANDed together to produce masked number signal 314. It should be understood that the determined length of the back off time of half duplex NIC 118 is directly related to the value of masked number signal 314. Specifically, as the value of masked number signal 314 becomes smaller, the determined back off time becomes shorter. It should be further appreciated that mask signal 312 of the present embodiment is specifically used to mask part or all of the bits of the random number signal 310 in order to produce the masked number signal 314 having a predetermined value limit. In other words, mask signal 312 is used by the present embodiment to establish an upper value limit for the resulting masked number signal 314.

For example, in order to restrict the value of the masked number signal 314 to the value of the 4 least significant bits of random number signal 310, the 12 most significant bits of mask signal 312 are set equal to zero while its 4 least significant bits are set equal to 1. In this manner, AND gate 306 produces a masked number signal 314 equal to the value of the 4 least significant bits of random number signal 310. As such, mask signal 312 was used by the present embodiment to mask out the 12 most significant bits of random number signal 310 in order to produce masked number signal 314. Within another example, if all 16 bits of mask signal 312 are equal to zero, AND gate 306 produces a masked number signal 314 having a value equal to zero. Therefore, it is appreciated that the mask signal 312 of the present embodiment can be utilized to restrict the value of the masked number signal 314 to the value of any predetermined number of bits of random number signal 310.

Referring still to FIG. 3, the outputs of AND gate 306 are coupled to inputs of masked number register 308. As such, masked number signal 314 is output by AND gate 306 to masked number register 308, which is a 16 bit register. Masked number register 308 outputs the restricted value represented by masked number signal 314 to half duplex NIC 118. In order to determine the length of its back off time, half duplex NIC 118 of the present embodiment multiplies the value of masked number signal 314 by 512 clock cycles. The resulting number of clock cycles is the determined length of time for the back off time of half duplex NIC 118. As such, the determined back off time of half duplex NIC 118 is restricted to a shorter amount of time.

Figure 4:
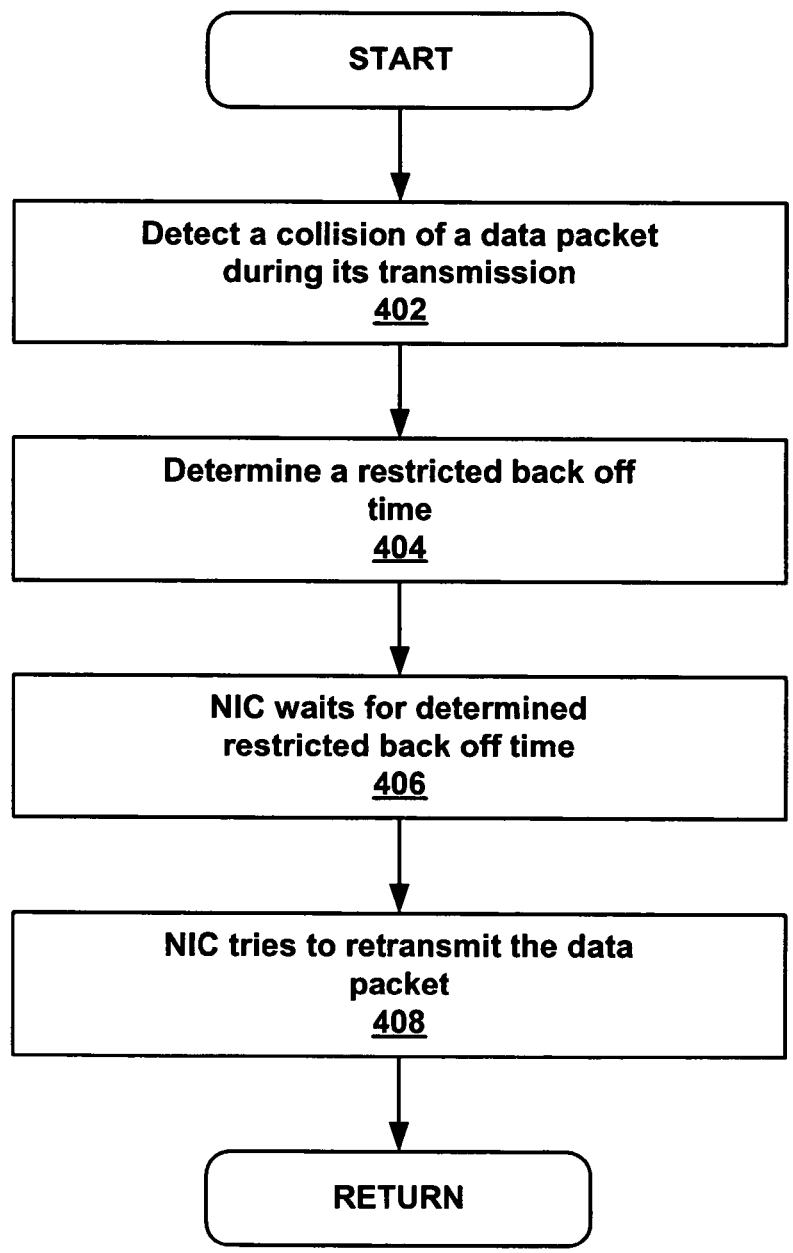
FIG. 4 is a flowchart of steps performed in accordance with one embodiment of the present invention for providing priority to a half duplex Network Interface Card (NIC) of a particular computer station which is coupled to an Ethernet network.

With reference now to FIG. 4, a flowchart 400 of steps performed in accordance with one embodiment of the present invention for providing priority to a half duplex Network Interface Card (NIC) of a particular computer station (e.g., file server) which is coupled to an Ethernet network is shown. Flowchart 400 includes processes of the present invention which, in one embodiment, are carried out by a processor and electrical components under the control of computer readable and computer executable instructions. The computer readable and computer executable instructions reside, for example, in data storage features such as a computer usable volatile memory unit 104 and/or computer usable non-volatile memory unit 106 of FIG. 1. Although specific steps are disclosed in flowchart 400 of FIG. 4, such steps are exemplary. That is, the present invention is well suited to performing various other steps or variations of the steps recited in FIG. 4.

At step 402, in one embodiment of the present invention, a collision of a data packet is detected during transmission of the data packet over a half duplex Ethernet network. It should be appreciated that step 402 of the present embodiment can be performed by a half duplex NIC coupled to the Ethernet network. Furthermore, it should be appreciated that the present embodiment is well suited to have a peripheral component perform step 402.

In step 404 of FIG. 4, in one embodiment of the present invention, a restricted back off time is determined by the half duplex NIC. It should be appreciated that the restricted back off time is substantially equal to or less than a restricted time value. Within the present embodiment, the restricted back off time is based on a number generated by a random number generator function. It is further appreciated that the determined restricted back off time is subsequently used during a later step of flowchart 200.

At step 406, in one embodiment of the present invention, the half duplex NIC waits for the determined restricted back off time before trying to retransmit the data packet over the half duplex Ethernet network. It should be appreciated that the smaller the restricted back off time is, the smaller the amount of time the half duplex NIC will wait before trying to retransmit the data packet over the Ethernet network.

At step 408 of FIG. 4, in one embodiment of the present invention, the half duplex NIC tries to retransmit the data packet over the Ethernet network. After completing step 408, the present embodiment of flowchart 400 is exited.

Thus, the present invention provides a method and system for providing priority to a half duplex Network Interface Card (NIC) of a particular computer station (e.g., file server) which is coupled to a congested Ethernet network. Furthermore, the present invention provides a method and system which achieves the above accomplishment and thereby improves the efficiency of data packet transmission over the Ethernet network of the half duplex NIC of the particular computer station.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for providing priority to a peripheral component by means of said peripheral component in a congested network, said method comprising the steps of:
   (a) detecting a collision of a data packet during transmission of said data packet by a peripheral component coupled to a network;
   (b) determining a restricted back off time, wherein said restricted back off time is substantially equal to or less than a restricted time value and is produced by a random generator function; and
   (c) causing said peripheral component to wait said restricted back off time before trying to retransmit said data packet over said network.

2. The method for providing priority to a peripheral component in a congested network as described in claim 1, wherein said step (a) comprises:
   detecting said collision of said data packet during transmission of said data packet by said peripheral component coupled to said network, wherein said peripheral component comprises a Network Interface Card (NIC).

3. The method for providing priority to a peripheral component in a congested network as described in claim 1, wherein said step (a) comprises:
   detecting said collision of said data packet during transmission of said data packet by said peripheral component coupled to said network, wherein said peripheral component comprises a half duplex Network Interface Card (NIC).

4. The method for providing priority to a peripheral component in a congested network as described in claim 1, wherein said step (a) comprises:
   detecting said collision of said data packet during transmission of said data packet by said peripheral component coupled to said network, wherein said network comprises an Ethernet network.

5. The method for providing priority to a peripheral component in a congested network as described in claim 1, wherein said step (a) comprises:
   detecting said collision of said data packet during transmission of said data packet by said peripheral component coupled to said network, wherein said network comprises a half duplex Ethernet network.

6. The method for providing priority to a peripheral component in a congested network as described in claim 1, wherein said step (b) comprises:
   determining said restricted back off time, wherein said restricted back off time is based on a number generated by a random number generator function.

7. The method for providing priority to a peripheral component in a congested network as described in claim 1, wherein said step (b) comprises:
   determining said restricted back off time, wherein said restricted back off time is associated with an Ethernet network.

8. A computer system comprising:
   a processor;
   an addressable data bus coupled to said processor;
   a peripheral component coupled to communicate with said processor, wherein said peripheral component is for performing a method for providing priority to said peripheral component coupled to a network, said method comprising the steps of:
   (a) detecting an unforced collision a collision of a data packet during transmission of said data packet by said peripheral component;
   (b) determining a restricted back off time, wherein said restricted back off time is substantially equal to or less than a restricted time value and is produced by a random generator function; and
   (c) causing said peripheral component to wait said restricted back off time before trying to retransmit said data packet over said network.

9. The computer system as described in claim 8 wherein said peripheral component comprises a Network Interface Card (NIC).

10. The computer system as described in claim 8 wherein said peripheral component comprises a half duplex Network Interface Card (NIC).

11. The computer system as described in claim 8 wherein said network comprises an Ethernet network.

12. The computer system as described in claim 8 wherein said network comprises a half duplex Ethernet network.

13. The computer system as described in claim 8 wherein said step (b) comprises:
   determining said restricted back off time, wherein said restricted back off time is based on a number generated by a random number generator function.

14. The computer system as described in claim 8 wherein said step (b) comprises:
   determining said restricted back off time, wherein said restricted back off time is associated with an Ethernet network.

15. A computer readable medium having computer readable code embodied therein for causing a peripheral component to perform the steps of:
   (a) detecting a collision of a data packet during transmission of said data packet by said peripheral component coupled to a network;
   (b) determining a restricted back off time, wherein said restricted back off time is substantially equal to or less than a restricted time value and is produced by a random generator function; and (c) causing said peripheral component to wait said restricted back off time before trying to retransmit said data packet over said network.

16. The computer readable medium as described in claim 15, wherein said step (a) comprises:

detecting said collision of said data packet during transmission of said data packet by said peripheral component coupled to said network, wherein said peripheral component comprises a Network Interface Card (NIC).

17. The computer readable medium as described in claim 15, wherein said step (a) comprises:

detecting said collision of said data packet during transmission of said data packet by said peripheral component coupled to said network, wherein said peripheral component comprises a half duplex Network Interface Card (NIC).

18. The computer readable medium as described in claim 15, wherein said step (a) comprises:

detecting said collision of said data packet during transmission of said data packet by said peripheral component coupled to said network, wherein said network comprises an Ethernet network.

19. The computer readable medium as described in claim 15, wherein said step (a) comprises:

detecting said collision of said data packet during transmission of said data packet by said peripheral component coupled to said network, wherein said network comprises a half duplex Ethernet network.

20. The computer readable medium as described in claim 15, wherein said step (b) comprises:

determining said restricted back off time, wherein said restricted back off time is based on a number generated by a random number generator function.

21. The computer readable medium as described in claim 15, wherein said step (b) comprises:

determining said restricted back off time, wherein said restricted back off time is associated with an Ethernet network.

* * * * *